US011038656B2

(12) United States Patent
Wang et al.

(10) Patent No.: US 11,038,656 B2
(45) Date of Patent: Jun. 15, 2021

(54) SEQUENCE BASED UPLINK CONTROL INFORMATION DESIGN FOR NEW RADIO

(71) Applicant: QUALCOMM Incorporated, San Diego, CA (US)

(72) Inventors: Renqiu Wang, San Diego, CA (US); Yi Huang, San Diego, CA (US); Peter Gaal, San Diego, CA (US); Hao Xu, Beijing (CN); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 15/991,727

(22) Filed: May 29, 2018

(65) Prior Publication Data

US 2018/0351724 A1    Dec. 6, 2018

Related U.S. Application Data

(60) Provisional application No. 62/513,392, filed on May 31, 2017.

(51) Int. Cl.
*H04W 72/04* (2009.01)
*H04L 5/00* (2006.01)
(Continued)

(52) U.S. Cl.
CPC .......... *H04L 5/0055* (2013.01); *H04L 1/1861* (2013.01); *H04L 5/0037* (2013.01);
(Continued)

(58) Field of Classification Search
CPC ... H04L 5/0055; H04L 1/1861; H04L 5/0037; H04L 25/0226; H04L 25/0204;
(Continued)

(56) References Cited

U.S. PATENT DOCUMENTS 7,983,237 B2 *   7/2011  Qu .................. H04L 5/0053
                                                 370/344
8,861,467 B2 * 10/2014  Ahn ................ H04L 1/1861
                                                 370/329
(Continued)

FOREIGN PATENT DOCUMENTS

EP        3346629 A1       7/2018
WO    WO-2017036419 A1    3/2017

OTHER PUBLICATIONS

Djikeussi L., et al., "LTE: Der Mobilfunk der Zukunft Reference Signals and Channel Estimation", Nov. 25, 2009, XP055098478, Retrieved from the Internet: URL:http://www.lmk.lnt.de/fileadmin/Lehre/Seminar09/Ausarbeitungen/Ausarbeitung_Leumaleu.pdf [retrieved on Jan. 27, 2014], 14 pages.

(Continued)

*Primary Examiner* — Phuc H Tran
(74) *Attorney, Agent, or Firm* — Arent Fox, LLP

(57) ABSTRACT

The present disclosure generally relates to methods, and apparatus for implementing the methods, for using sequence based uplink control information in 5G New Radio wireless communications. The method may include a user equipment (UE) may construct a signal based at least on resource assignment information received from a base station. The resource assignment information received by the UE may indicate frequency resources, a base sequence index, and a shift index. In a non-limiting example, the resource assignment information may include frequency resource assignment information related to one or more clusters. In implementations in which the frequency resource information includes a plurality of clusters, each of the plurality of clusters use a different base sequence and may use the same or different cyclic shifts. These sequences may be multiplexed in a non-orthogonal manner. The UE may use the resource assignment information to transmit the constructed signal to the base station.

37 Claims, 10 Drawing Sheets

(51) Int. Cl.
  *H04L 25/02* (2006.01)
  *H04W 76/28* (2018.01)
  *H04L 1/18* (2006.01)

(52) U.S. Cl.
  CPC ........ *H04L 5/0053* (2013.01); *H04L 25/0202* (2013.01); *H04L 25/0204* (2013.01); *H04L 25/0226* (2013.01); *H04W 72/0493* (2013.01); *H04W 76/28* (2018.02); *H04L 5/0048* (2013.01); *H04W 72/042* (2013.01); *H04W 72/0453* (2013.01)

(58) Field of Classification Search
  CPC . H04L 25/0202; H04L 5/0053; H04L 5/0048; H04W 72/0493; H04W 76/28; H04W 72/0453; H04W 72/042
  See application file for complete search history.

(56) References Cited

U.S. PATENT DOCUMENTS

| | | | | |
|---|---|---|---|---|
| 9,203,585 | B2* | 12/2015 | Hooli | H04L 1/0026 |
| 9,451,599 | B2* | 9/2016 | Cheng | H04L 1/0073 |
| 9,544,885 | B2* | 1/2017 | You | H04L 1/1861 |
| 10,523,395 | B2* | 12/2019 | Kim | H04L 5/0053 |
| 10,693,523 | B2* | 6/2020 | Kim | H04L 5/1469 |
| 2013/0028203 | A1* | 1/2013 | Hooli | H04L 1/0026 370/329 |
| 2013/0189930 | A1* | 7/2013 | Kinnunen | H04L 5/0051 455/67.11 |
| 2019/0069312 | A1* | 2/2019 | Oh | H04W 72/04 |
| 2019/0081660 | A1* | 3/2019 | Han | H04B 1/7143 |
| 2019/0222254 | A1* | 7/2019 | Kim | H04L 5/1469 |
| 2020/0021410 | A1* | 1/2020 | Choi | H04L 5/0051 |
| 2020/0067680 | A1* | 2/2020 | Nayeb Nazar | H04W 72/0453 |
| 2020/0092876 | A1* | 3/2020 | Cho | H04W 72/0413 |
| 2020/0170005 | A1* | 5/2020 | Matsumura | H04L 1/1812 |

OTHER PUBLICATIONS

International Search Report and Written Opinion—PCT/US2018/035174—ISA/EPO—Sep. 10, 2018.
Motorola Mobility et al., "Short PUCCH Structure", 3GPP DRAFT; R1-1708308, vol. RAN WG1, No. Hangzhou; May 15, 2017-May 19, 2017, May 7, 2017, XP051263189, Retrieved from the Internet: URL:http://www.3gpp.org/ftp/tsg_ran/WG1_RL1/TSGR1_89/Docs/ [retrieved on May 7, 2017], 5 pages.

* cited by examiner

SEQUENCE BASED UPLINK CONTROL INFORMATION DESIGN FOR NEW RADIO

CROSS-REFERENCE TO RELATED APPLICATIONS

The present Application for patent claims priority to Provisional Application No. 62/513,392 entitled "Sequence Based Acknowledgement Design for New Radio" filed May 31, 2017, which is assigned to the assignee, and incorporated herein by reference in its entirety.

BACKGROUND

Aspects of the present disclosure relate generally to wireless communication networks, and more particularly, to techniques for transmitting uplink control information (UCI) in wireless communications.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband (EMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, in a new radio (NR), a sequence based UCI, e.g. ACK/NACK or scheduling request (SR) technique may be used for transmitting one or two ACK/NACK/SR bits in a uplink (UL) short burst. However, the sequence based ACK/NACK/SR technique may not work well if ACK/NACK/SRs of multiple UEs (e.g., users) are to be transmitted to a base station (e.g., gNB). Thus, there is a need for improved techniques for efficient communications.

SUMMARY

The following presents a simplified summary of one or more implementations to provide a basic understanding of such implementations. This summary is not an extensive overview of all contemplated implementations, and is intended to neither identify key or critical elements of all implementations nor delineate any implementations. Its sole purpose is to present concepts of one or more implementations in a simplified form as a prelude to the more detailed description presented later.

In an implementation, the present disclosure includes an example method of wireless communication between a use equipment (UE) and a base station. The example method may include receiving, at the UE, resource assignment information from a base station, wherein the resource assignment information indicates frequency resources, a base sequence index, and a shift index. The example method may include constructing, at the UE, a signal based at least on the received resource assignment information. The example method may include transmitting, from the UE, the constructed signal based at least on the received resource assignment information to the base station.

The present disclosure also includes a UE that components configured to execute, or means for conducting wireless communications. The example UE may include a memory and a processor in communication with the memory wherein the processor configured to receive resource assignment information from a base station, wherein the resource assignment information indicates frequency resources, a base sequence index, and a shift index. The UE processor may also be configured to construct a signal based at least on the received resource assignment information and transmit the constructed signal based at least on the received resource assignment information to the base station.

The present disclosure also includes an UE that includes components configured to execute, or means for conducting wireless communications. The example UE may include means for receiving resource assignment information from a base station, wherein the resource assignment information indicates frequency resources, a base sequence index, and a shift index. The example UE may include means for constructing a signal based at least on the received resource assignment information. The example UE may include means for transmitting the constructed signal based at least on the received resource assignment information to the base station.

The present disclosure also includes computer-readable media having stored thereon processor-executable code for performing wireless communications. The code may include code for receiving, at a UE, resource assignment information from a base station, wherein the resource assignment information indicates frequency resources, a base sequence index, and a shift index. The code may include code for constructing, at the UE, a signal based at least on the received resource assignment information. The code may include code for transmitting, from the UE, the constructed signal based at least on the received resource assignment information to the base station.

In another implementation, the present disclosure includes an example method of wireless communication between a base station and a UE. The example method may include receiving, at the base station, a signal from a UE. The example method may also include correlating, at the base station, the received signal with each possible uplink control information (UCI) hypothesis sequence of a plurality of UCI hypothesis sequences to output a plurality of correlated signals. The example method may include estimating, at the base station, a channel based on each of the correlated signals. The example method may include determining, at the base station, a total energy of each of the estimated channels. The example method may further include identifying, at the base station, a hypothesis with a highest total energy based on the determining. The example method may also include selecting, at the base station, a sequence associated with the hypothesis with the highest total energy as the sequence that is transmitted to the base station from the UE.

The present disclosure also includes a base station that includes components configured to execute, or means for wireless communications. The example base station may include a memory and a processor coupled to the memory wherein the processor configured to receive a signal from a UE. The base station processor may be further configured to correlate the received signal with each possible uplink control information (UCI) hypothesis sequence of a plurality of UCI hypothesis sequences to output a plurality of correlated signals. The base station processor may be further configured to estimate a channel based on each of the correlated signals. The base station processor may be further configured to determine a total energy of each of the estimated channels. The base station processor may be further configured to identify a hypothesis with a highest total energy based on the determining. The base station processor may be further configured to select a sequence associated with the hypothesis with the highest total energy as the sequence that is transmitted to the base station from the UE.

The present disclosure also includes a base station that includes components configured to execute, or means for wireless communications. The example base station may include means receiving a signal from a UE. The example base station may also include means for correlating, at the base station, the received signal with each possible uplink control information (UCI) hypothesis sequence of a plurality of UCI hypothesis sequences to output a plurality of correlated signals. The example base station may include means for estimating a channel based on each of the correlated signals. The example base station may include means for determining, at the base station, a total energy of each of the estimated channels. The example base station may further include means for identifying, at the base station, a hypothesis with a highest total energy based on the determining. The example base station may also include means for selecting a sequence associated with the hypothesis with the highest total energy as the sequence that is transmitted to the base station from the UE.

The present disclosure also includes computer-readable media having stored thereon processor-executable code for performing wireless communications. The code may include code for receiving, at the base station, a signal from a UE. The code may also include code for correlating, at a base station, the received signal with each possible uplink control information (UCI) hypothesis sequence of a plurality of UCI hypothesis sequences to output a plurality of correlated signals. The code may include code for estimating, at the base station, a channel based on each of the correlated signals. The code may include code for determining, at the base station, a total energy of each of the estimated channels. The code may further include code for identifying, at the base station, a hypothesis with a highest total energy based on the determining. The code may also include code for selecting, at the base station, a sequence associated with the hypothesis with the highest total energy as the sequence that is transmitted to the base station from the UE.

To the accomplishment of the foregoing and related ends, the one or more implementations comprise the features described and particularly pointed out in the claims. This description and the annexed drawings set forth in detail certain illustrative features of the one or more implementations. These features are indicative, however, of but a few ways in which the principles of various implementations may be employed, and this description should include all such implementations and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
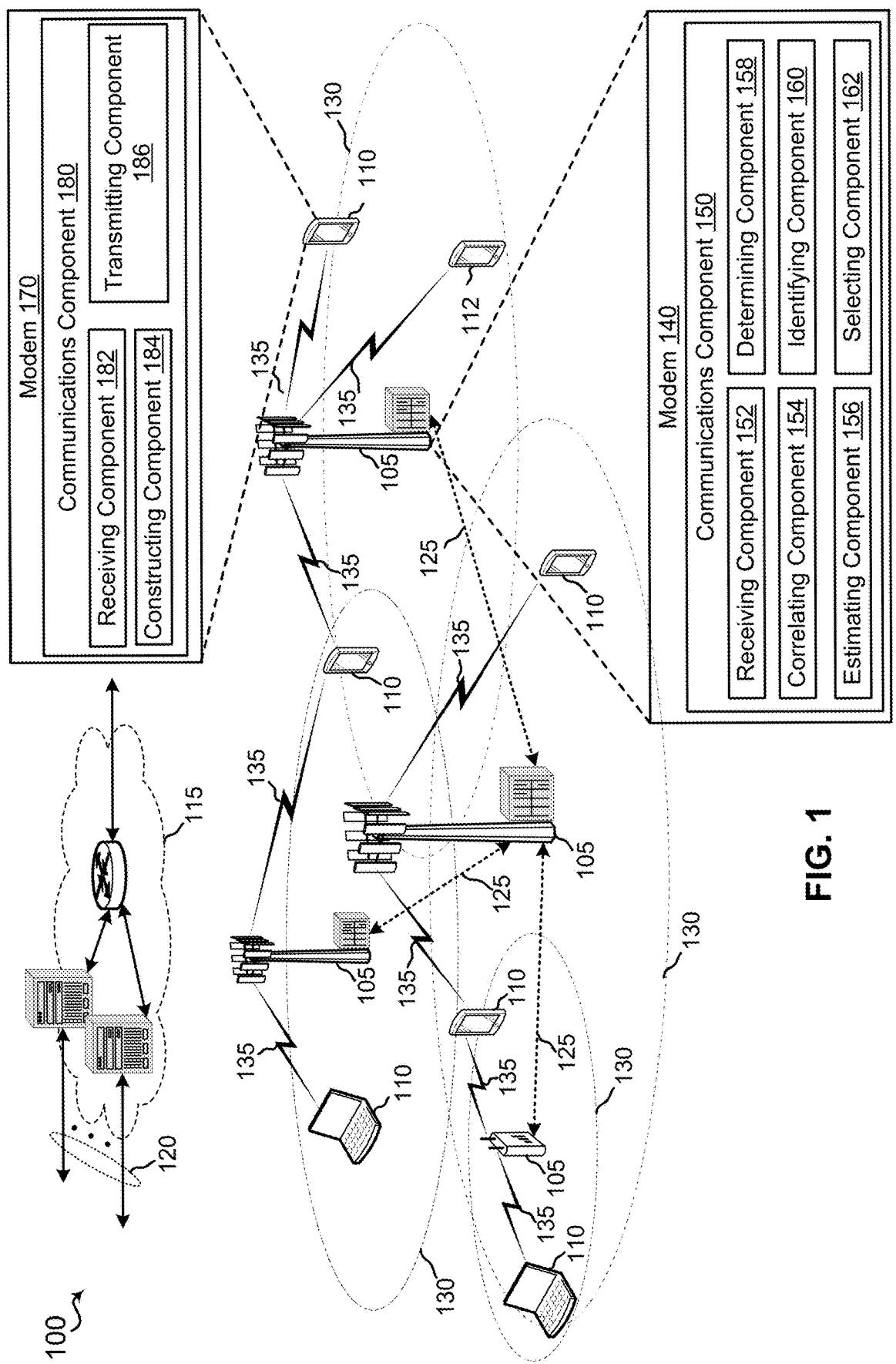
FIG. 1 is a schematic diagram of an example wireless communication network including at least base station having a communications component and at least a user equipment having a corresponding communication component.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to methods, and apparatus for implementing the methods, for using sequence based uplink control information in 5G New Radio wireless communications. In an implementation, for example, a user equipment (UE) may construct or otherwise generate a signal bearing uplink control information (UCI) for use in carrying the UCI to a base station (e.g., a gNB). The signal may be constructed to include one or more sequences of UCI information. The signal may have a specific structure including a cyclic shift, frequency resource, and/or starting base sequence index, which may be provided by a base station to enable the receiving base station to quickly decode the UCI-bearing signal and/or to identify the UCI-bearing signal from a specific UE from among a plurality of UEs based on the structure. In order to conserve resources within a resource block (RB) multiple UEs may multiplex base sequences having common or symbiotic resource assignments from the base station.

For example, a UE may construct a signal based at least on resource assignment information received from a base station. The resource assignment information received by the UE may indicate frequency resources, a base sequence index, and a shift index. In a non-limiting example, the resource assignment information may include frequency resource assignment information related to one or more clusters. In implementations in which the frequency resource information includes a plurality of clusters, each of the plurality of clusters use a different base sequence and may use the same or different cyclic shifts. These sequences may be multiplexed in a non-orthogonal manner with the sequences of other UEs/users. The UE may use the resource assignment information to transmit the constructed signal to the base station in a resource block, possibly multiplexed with other UCI-bearing signals from other UEs.

In an implementation, for example, the UE may further use a same base sequence index and same frequency resources as a plurality of users, but the UE and the plurality of users may use different shift indexes, or the UE and the plurality of users may use a same or different shift indices and same frequency resources and the UE and the plurality of users may use different base sequence indices.

In another implementation, for example, a base station may receive a signal from a UE and may correlate the received signal with each possible uplink control information (UCI) hypothesis sequence of a plurality of UCI hypothesis sequences to output a plurality of correlated signals. This correlation may be performed individually for each of the UCI hypothesis sequences. In various implementations, UCI may include acknowledgement (ACK), negative-acknowledgement (NACK), and/or scheduling request (SR) information. The base station may estimate a channel based on each of the correlated signals, using a time domain or a frequency domain. For each of the estimated channels, the base station may determine a total energy allocation and may use this information to determine a corresponding hypothesis having the highest total energy of the determined energies. The base station may select a sequence associated with the identified hypothesis to be the sequence to be used by the UE in transmitting UCI information to the base station.

In some implementations, the base station may also estimate a noise and interference variance based on the hypothesis with the highest energy. The base station may compare the highest total energy with a product of a threshold and the estimated noise and interference variance. It may be determined that a sequence is transmitted to the base station from UE when the highest total energy is greater than the product of the threshold and the noise and interference variance. In other implementations, the base station may estimate a noise and interference variance based on the hypothesis with the highest energy. The base station may compare the highest total energy with a product of a threshold and the noise and interference variance. Further, the base station may determine that the UE is in a discontinuous transmission (DTX) mode when the highest total energy is lower than or equal to the product of the threshold and the noise and interference variance.

The various aspects may be implemented across a variety of 5G NR services such as enhanced mobile broadband (EMBB) and ultra-reliable-low latency communications (URLLC) and offers several improvements to these technologies. By enabling a base station to indicate to UEs, a sequence in which UCI information should be transmitted, the present disclosure enables reduced decoding times at a receiving base station. Because the base station estimates channel resource needs as part of selecting a sequence for UCI information transmittal, resources may be divided evenly amongst users, thereby enabling efficient channel division for multi-user UCI information transmittal.

Additional features of the present aspects are described in more detail below with respect to FIGS. 1-10.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one base station 105 (e.g., eNB or gNB) with a modem 140 having a communications component 150 that manages execution of a receiving component 152, a correlating component 154, an estimating component 156, a determining component 158, an identifying component 160, and/or a selecting component 162. The example wireless communication network 100 may further include a plurality of user equipment (UEs), e.g., a UE 110. The UE 110 may further include a modem 170 having a communications component 180 that manages execution of a receiving component 182, a constructing component 184, and/or a transmitting component 186.

According to the present disclosure, for example, the base station 105 (or gNB) may receive a signal from the UE 110. The base station 105 has knowledge of all the possible sequences or hypothesis sequences that may be received from the UE 110 (or transmitted by the UE 110). The base station 105 correlates the received signal with each of the possible hypothesis sequences to output or generate a plurality of correlated signals. During the correlation, the base station 105 uses the corresponding hypothesis sequences as pilot tones. Further, the base station 105 then estimates a channel based on the correlated signal for each of the plurality of correlated signals and determines an energy level for each of the estimated channels along with identifying a hypothesis with the highest total energy. The base station 105 selects the sequence with the hypothesis with the highest total energy as the sequence that is transmitted by the UE 110. In other words, the base station 105 determines energy of the estimated channels for each of the correlated signals and selects (e.g., determines) that the hypothesis sequence with the highest energy is the sequence transmitted by the UE 110. Additionally, the UE 110 may transmit the sequences in a single cluster or a multi-cluster using orthogonal and non-orthogonal multiplexing. Each cluster may use one or more contiguous resource blocks (RBs) while maintaining low peak-to-average power ratio (PAPR).

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for the core network 115 support of radio bearers for the user plane data. At the physical (PHY) layer, the transport channels may be mapped to physical channels.

The UEs 110 may be dispersed throughout the wireless communication network 100, and each UE 110 may be stationary and/or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs 110. A UE 110 may be able to communicate with various types of base stations 105 and network equipment including macro eNBs, small cell eNBs, macro gNBs, small cell gNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bi-directional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, the base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or a listen before talk (LBT) procedure prior to communicating in order to determine whether the channel is available.

Additionally, one or more of the base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, the base stations 105 and/or UEs 110 operating according to the mmW technology may utilize beamforming in their transmissions to compensate for the extremely high path loss and short range.

Figure 2:
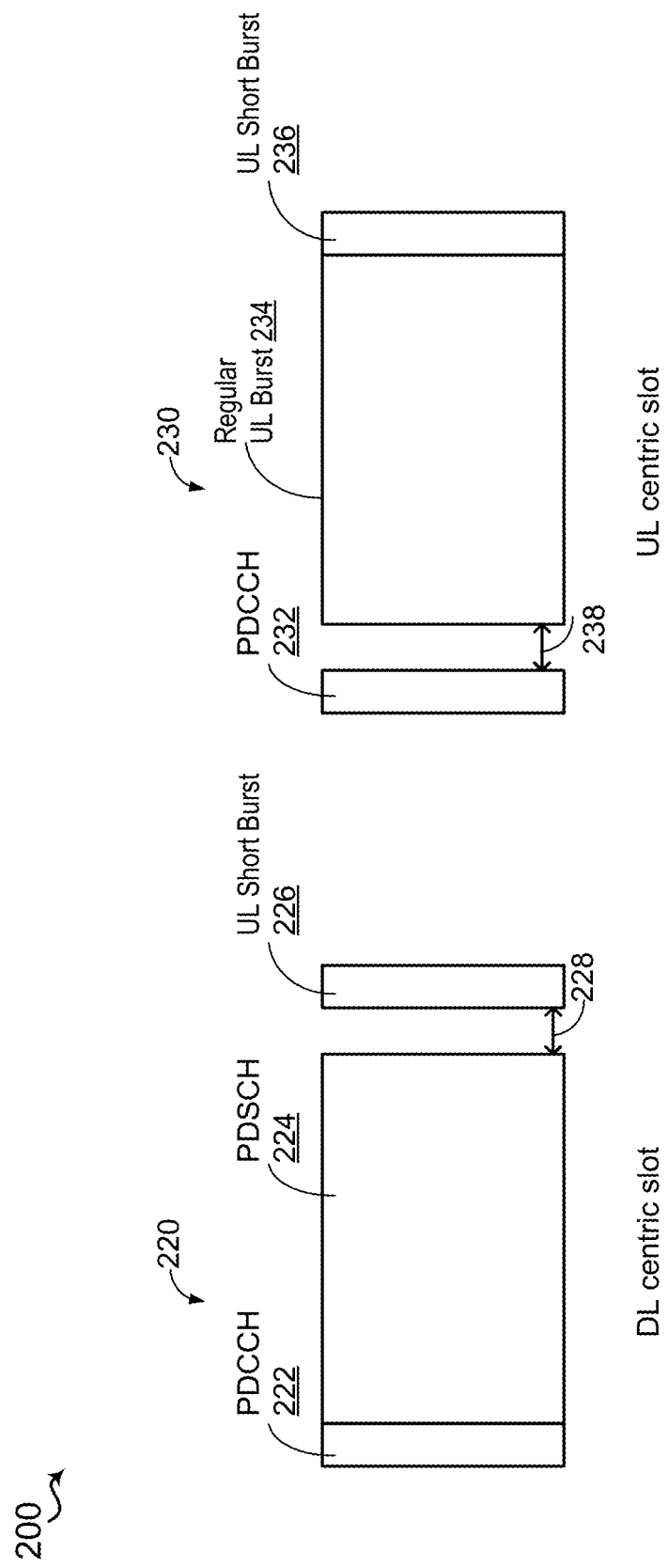
FIG. 2 illustrates an example slot (or frame) structure including a downlink centric slot and/or a uplink centric slot according to various aspects of the present disclosure.

Referring to FIG. 2, an example slot (or frame) structure 200 includes a downlink centric slot 220 and/or a uplink centric slot 230. As illustrated in FIG. 2, a downlink centric slot 220 may include a physical downlink control channel (PDCCH) 222, a physical downlink shared channel (PDSCH) 224, and/or a uplink short burst 226. A uplink centric slot 230 may include a PDCCH 232, a regular uplink burst 234, and/or an uplink short burst 236. The uplink short bursts, 226 and 236 are, in general, of fixed length, and may be one or two OFDM symbols in length. In some implementations, a guard interval 228 may separate PDSCH 224 and uplink short burst 226, and/or a guard interval 238 may separate PDSCH 224 and a regular uplink burst 234 to minimize or avoid interference.

In some implementations, uplink short bursts (e.g., 236) may be used to transmit uplink control information (UCI) e.g., ACK bits. In general, uplink short bursts may have one or two OFDM symbols. For uplink short burst of one or two bits, sequence-based UCI design may be used, with one sequence for each hypothesis.

Figure 3:
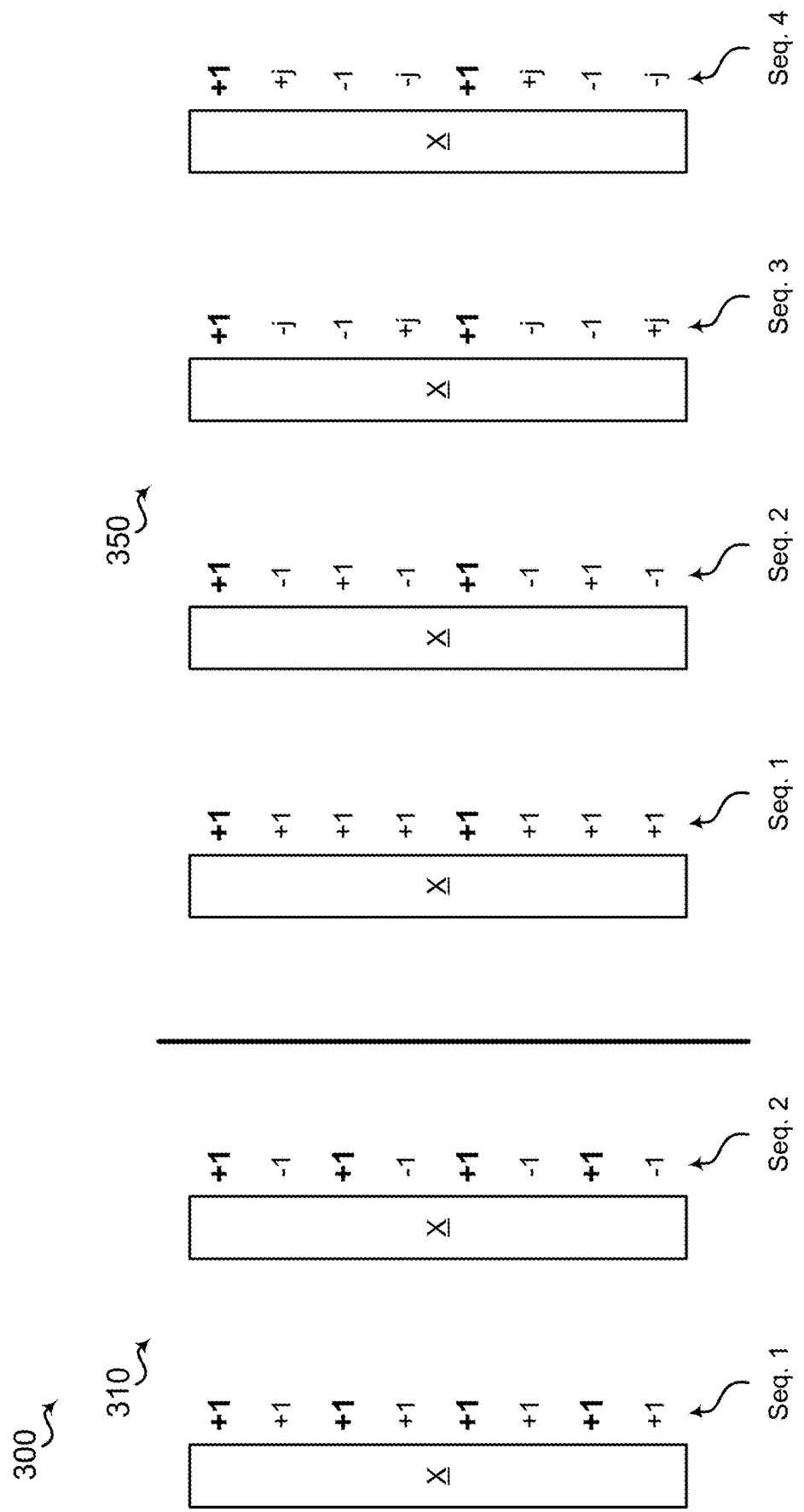
FIG. 3 illustrates an example sequence with cyclic shifts according to various aspects of the present disclosure.

Referring to FIG. 3, example sequences 300 with cyclic shifts are illustrated. The example sequence designs may be used to convey small payload (e.g., 1 or 2 bits) of UCI. The UCI may include a scheduling request (SR), acknowledgement feedback (ACK/NACK), or a combination of the SR and ACK/NACK. The sequence design may also be used to convey the small payload of the UCI with a sounding reference signal (SRS).

For example, sequences 310 illustrate a 1 bit ACK with two hypotheses with a cyclic shift of 0 and Length/2 in time domain. In a frequency domain, the two hypotheses may have identical values on every other (e.g., alternate) tones, and for the other (alternate) tones they are opposite to each other. The identical values of the two hypotheses may be used as demodulation reference signal (DMRS) tones. In an additional example, sequences 350 illustrate a 2 bit ACK with a total of four hypothesis with a minimum shift distance of Length/4. This may allow the use of every four tones as DMRS tones.

The base sequences of 310 and 350 may be any low peak-to-average power ratio (PAPR) sequences, e.g., computer generated sequences (CGS) or Zadoff-Chu sequences. The sequences may be generally defined as complex-valued constant envelope mathematical sequences that have low PAPR. The sequences may be considered to have low PAPR as compared to the PAPR of other sequences such as a random data with quadrature phase shift keying (QPSK), quadrature amplitude modulation (QAM), or a pseudo random sequence like a Gold sequence.

Figures 4A, 4B:
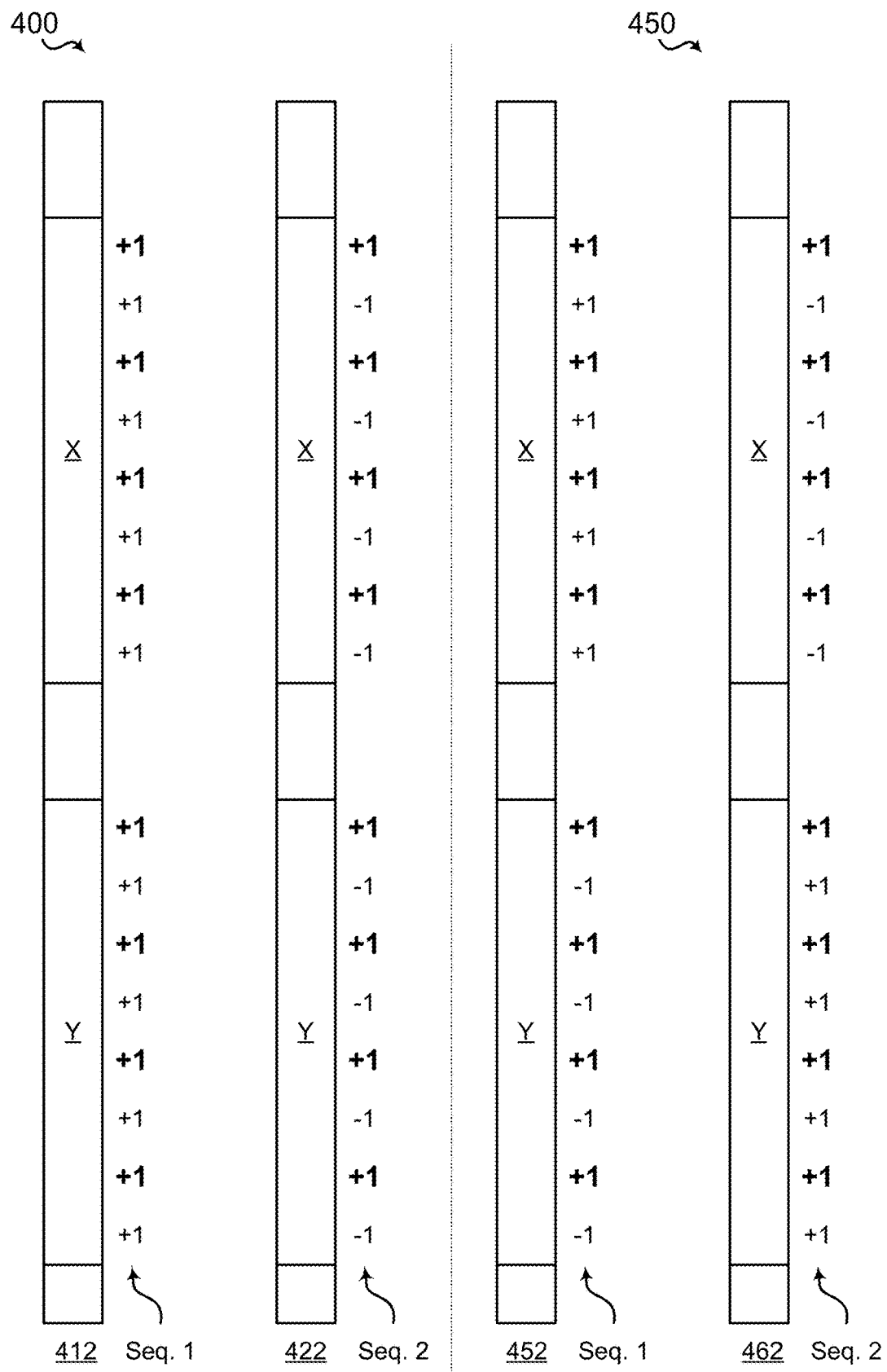
FIG. 4A illustrates an example sequence with frequency allocation in single cluster according to various aspects of the present disclosure.
FIG. 4B illustrates an example sequence with frequency allocation in multiple clusters according to various aspects of the present disclosure.

Referring to FIGS. 4A and 4B, example sequences 400 and 450 for frequency allocation are illustrated. The sequence may be transmitted with a single cluster. That is, the sequence may be transmitted on consecutive RBs in frequency domain. Alternatively, the sequence may be transmitted with multiple clusters. That is, the sequence may be transmitted on disjoint RBs.

FIG. 4A illustrates example sequences 400 for multi-cluster transmission with two clusters. The two clusters may use different PAPR base sequences (e.g., low PAPR base sequences). The different base sequences are represented by sequences X and Y at the top and the bottom halves of each hypothesis. X and Y have low PAPR properties when transmitted separately. The concatenated base sequences [X Y] are used as base sequences for a multi-cluster transmission. Same shifts may be applied to each cluster. For hypothesis 1 (412), both upper and lower cluster have zero shift indicated by all "1s" in the frequency ramping. For hypothesis 2 (422), both upper and lower clusters use "1" and "−1" frequency ramping, which indicates a shift of shift L/2.

FIG. 4B illustrates example sequences 450 in a configuration with different cyclic shifts used for different clusters and for the same hypothesis (also referred to as shift hopping) in a multi-cluster transmission. For example, the upper and lower clusters use different frequency ramping for hypothesis 1 (452) and hypothesis 2 (462), respectively.

Figure 5:
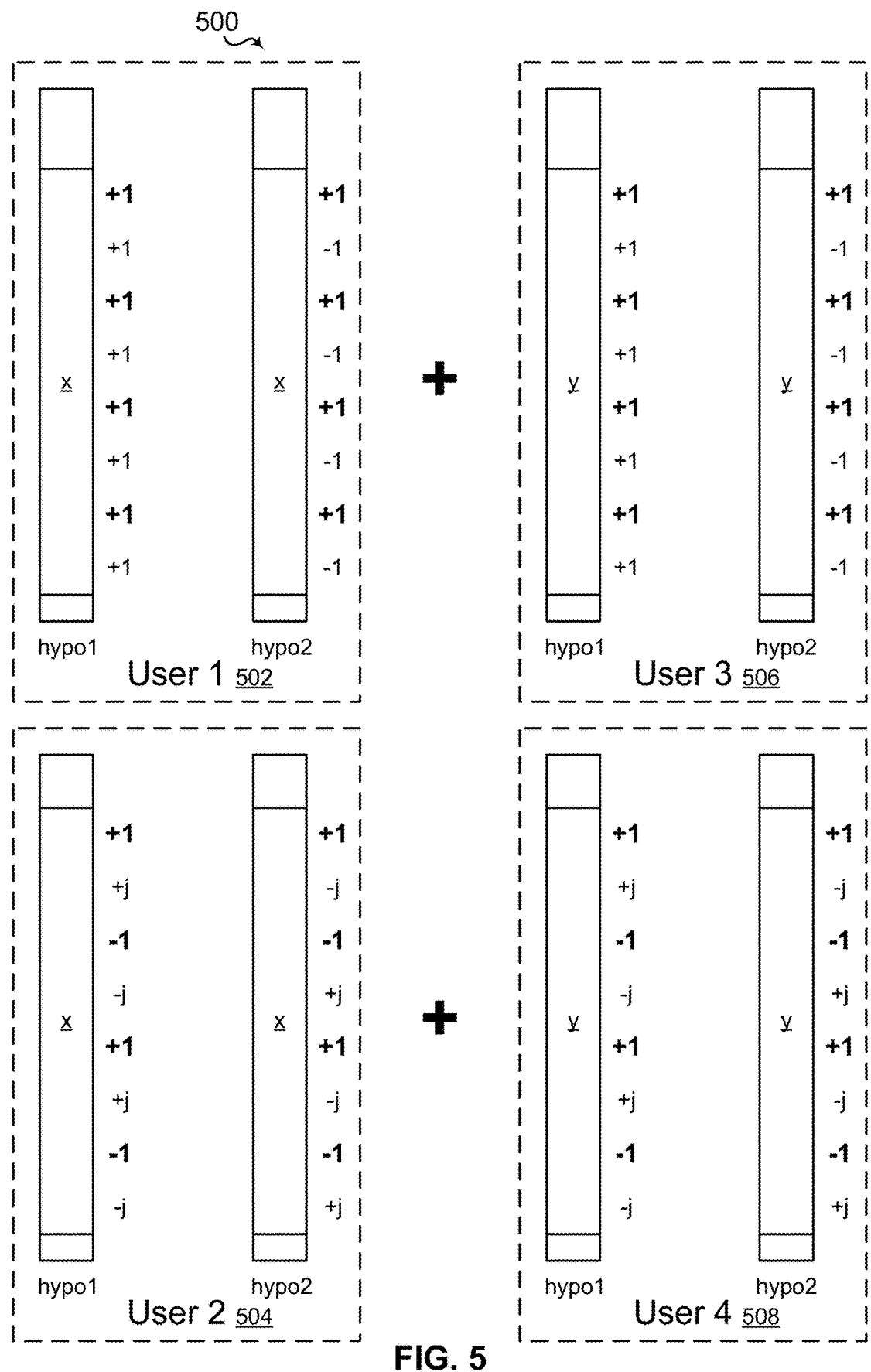
FIG. 5 illustrates example sequences in a single cluster configuration with four users code division multiplexed according to various aspects of the present disclosure.

FIG. 5 illustrates example sequences 500 in a single cluster configuration CDM with four users 502, 504, 506, and 508.

For example, the four users 502, 504, 506, and 508 are multiplexed with 1 bit. Two users, 502 and 504, are configured with a base sequence X and two users, 506 and 508, are configured with a base sequence Y. In some other configuration with the base sequence X, six users with a 1 bit uplink control information (UCI) may be multiplexed within one RB of 12 tones. Each user may use two shifts for two hypothesis separated with length/2. Additionally, different users may be separated with different shifts in time domain. Similarly, in some configurations with the base sequence Y, six users with a 1 bit UCI may be multiplexed within one RB. In some other configurations, 12 users each with 1 bit of UCI may be multiplexed within one RB with 6 users using base sequence X and 6 users using base sequence Y. The 12 users may be from the same base station. Further, the received signals may be combinations of each user's signals. For instance, $r=(h\_1*s\_1)+(h2*s\_2)+ \ldots +n$, where $s\_i$ may be any of the hypothesis sequence for user i and $h\_i$ is the channel of user i, and n is the noise and interference.

In another aspect, users may be multiplexed within the same frequency band, and each user with 2 bits of UCI. Some users may use the same base sequence X. Each user may use 4 cyclic shifts in the time domain for the 4 hypothesis. Different users may use different cyclic shifts. Up to 3 users each with 2 bits of UCI may be multiplexed with the same base sequence X within one RB. Some users may use a different base sequence Y. Up to 3 users each with 2 bits of UCI may be multiplexed with the same base sequence Y within one RB. In this way up to 6 users each with 2 bits of UCI may be multiplexed within one RB. The 6 users may be from the same base station.

In another additional aspect, users from the same base station may be multiplexed within the same frequency band, and each user with different number of bits. The multiplexing may be non-orthogonal. The users may use the same or different base sequence and/or same or different number of shifts. For example, one user with 1 bit of UCI may use two cyclic shifts and another user with 2 bits of UCI may use 4 cyclic shifts.

Figure 6:
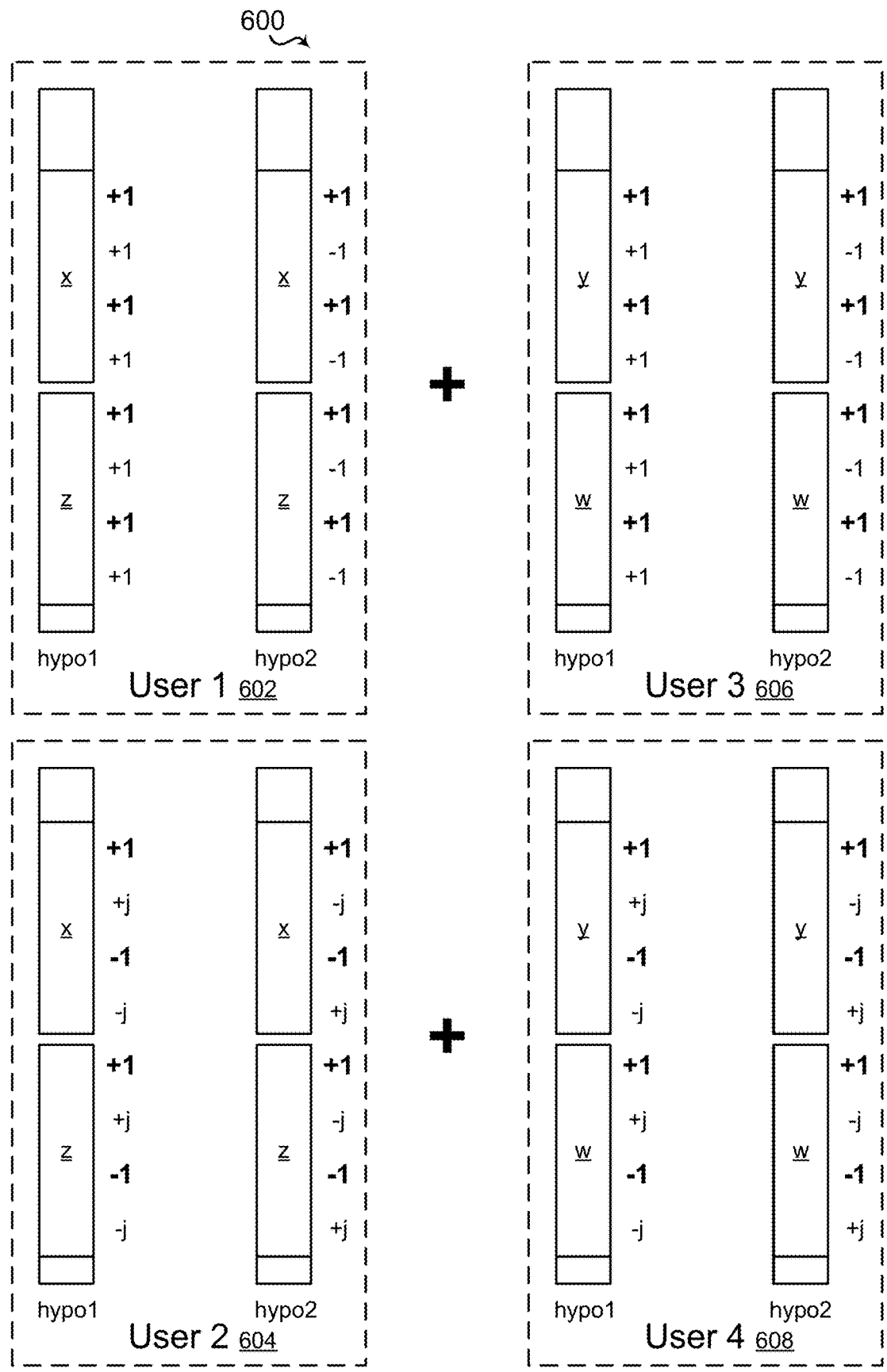
FIG. 6 illustrates additional example sequences in a single cluster configuration with four users code division multiplexed in the same frequency band according to various aspects of the present disclosure.

FIG. 6 illustrates example sequences 600 in a multi-cluster configuration with four users 602, 604, 606, and 608 with code division multiplexed in the same frequency band.

In an example, user multiplexing can be done with different base sequences and/or different cyclic shifts. User 1 (602) and user 2 (604) use the same base sequence but may use different cyclic shifts in the time domain. Consequently, phase ramping in the frequency domain is different. User 3 (606) and user 4 (608) also share the same base sequence but different cyclic shifts. In these configurations with the same base sequences but different cyclic shifts, the two users may be multiplexed orthogonal to each other.

In another example, user 1 (602) and user 3 (606) may have different base sequences but the same cyclic shifts in the time domain. Consequently, their phase ramping in the frequency domain is the same. User 2 (604) and user 4 (608) also may have different base sequences but the same cyclic shifts. Users with different base sequences may be multiplexed non-orthogonal to each other even when the cyclic shifts are the same.

In some other examples, up to 6 users each with 1 bit of UCI may be code division multiplexed with the same base sequence. Optionally, up to 3 users each user with 2 bits of UCI may be code division multiplexed with the same base sequences. The number of users multiplexed may be doubled when some users use a different base sequence in the same frequency band. The users with different number of bits of UCI may also be code division multiplexed in the same frequency band with same or different base sequence. As above, the multiplexing may be non-orthogonal.

Figure 7:
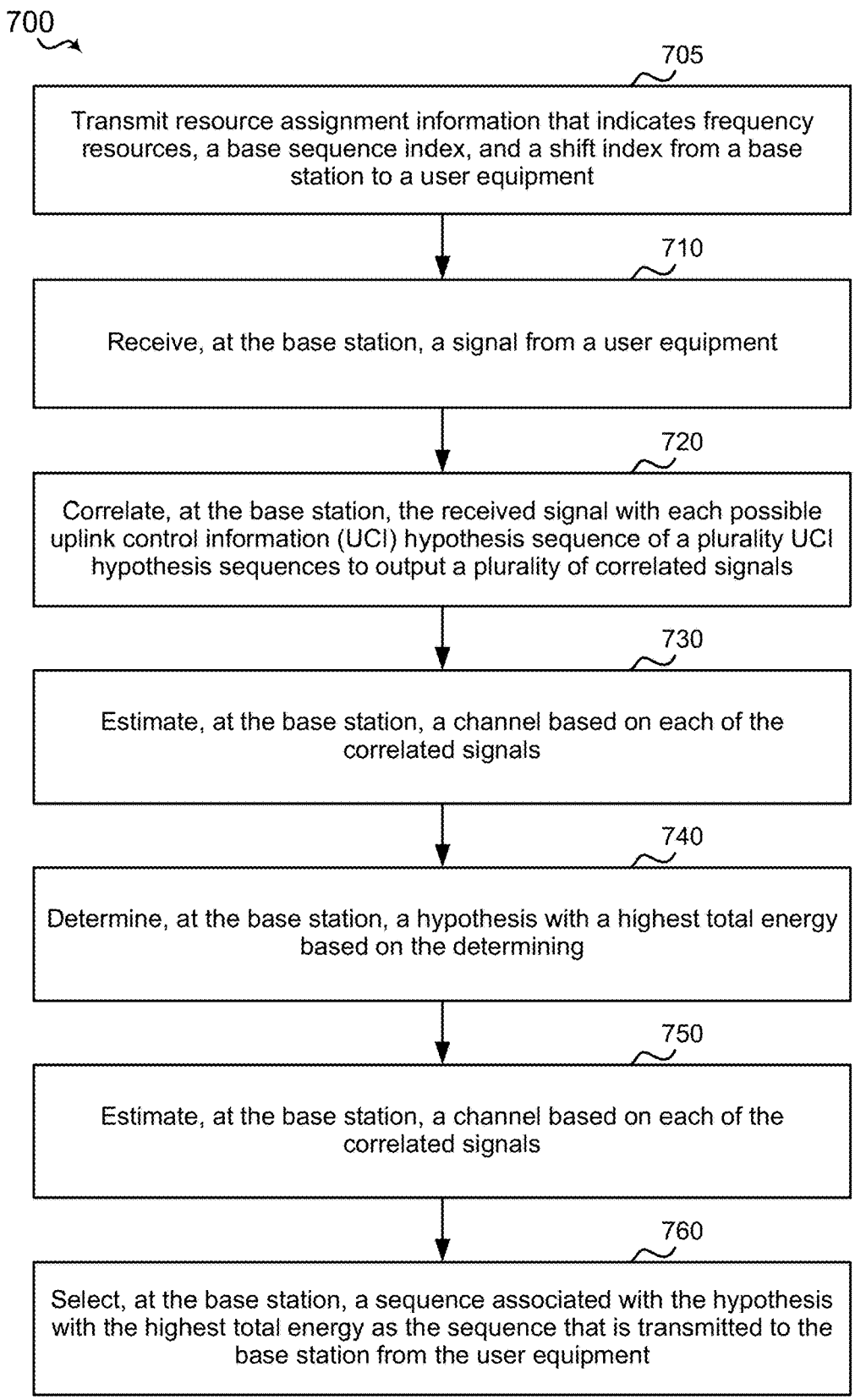
FIG. 7 illustrates an example method for wireless communications with a base station according to various aspects of the present disclosure.

Referring to FIG. 7, for example, a method 700 for wireless communications according to the above-described aspects is disclosed. Method 700 may be executed by base station 105 and/or one or more subcomponents thereof as discussed above and/or as additionally referred to in FIG. 9.

For example, at block 705, the method 700 includes transmitting resource assignment information to the UE, wherein the resource assignment information indicates frequency resources, a base sequence index, and a shift index. In an implementation, for example, base station 105 and/or modem 140 and/or communications component 150 and/or processor 912 and/or transmitter 908 is configured to transmit resource assignment information to the UE 110, wherein the resource assignment information indicates frequency resources, a base sequence index, and a shift index. For instance, the modem 140 and/or communications component 150 and/or processor 912 can select the resource assignment information from a set of available resource assignment information, and then can identify the selected resource assignment information in a message transmitted over the air to the UE 110. In an aspect, the resource assignment information includes frequency resource assignment information related to one or more clusters. In another aspect, the resource assignment information includes frequency resource assignment information related to more than one cluster, and wherein the each of the plurality of clusters use a different base sequence. In a further aspect, the frequency resource assignment information includes the frequency resource assignment information related to more than one cluster, wherein each of the plurality of clusters use a different base sequence, and wherein same or different cyclic shifts are used in each cluster. Additionally, the modem 140 and/or communications component 150 and/or processor 912 can select the resource assignment information to enable the UE 110 to construct a signal, e.g., to send UCI back to the base station 105, wherein the signal is multiplexed with other signals from a plurality of users within a resource block. For example, in some cases, the resource assignment information enables the UE 110 to construct a signal using a same base sequence index and same frequency resources assigned to a plurality of users and using a different shift index relative to other ones of the plurality of users. In other cases, the resource assignment information enables the UE 110 to construct a signal using a same shift index or the different shift indexes and the same frequency resources as assigned to the plurality of users and using a different base sequence index relative to the other ones of the plurality of users.

Further, at block 710, the method 700 includes receiving, at the base station, a signal from a user equipment (UE). For example, in an aspect, the base station 105 and/or the communications component 150 may include the receiving component 152, such as a specially programmed processor module, or a processor executing specially programmed code stored in a memory, to receive at the base station 105 a signal from the UE 110. The signal received from the UE 110 may include a sequence associated with uplink control information such as an ACK, a NACK, or a SR transmitted from the UE 110 in a common UL burst. The signal may be received by the base station 105 in a resource block and may be multiplexed with UCI-bearing signals from other users/UEs within the resource block. The UCI-bearing signals of different users may be multiplexed either orthogonally with the same base sequence but different cyclic shifts or non-orthogonally with different base sequences within the resource block. In some aspects, the received signals may be associated with a NR service such as an enhanced mobile broadband (EMBB) service or an ultra-reliable-low latency communications (URLLC) service.

At block 720, the method 700 includes correlating, at the base station, the received signal with each possible UCI hypothesis sequence of a plurality of UCI hypothesis sequences to output a plurality of correlated signals. For example, in an aspect, the base station 105 and/or the communications component 150 may include the correlating component 154, such as a specially programmed processor modules, or a processor executing specially programmed code stored in a memory to correlate the received signal with each possible hypothesis sequence. In an aspect, the correlating may be performed using a corresponding hypothesis sequence as pilot tones. As the base station 105 has knowledge of the possible hypothesis sequences, the correlating component 154 may correlate the received signal with the possible UCI hypothesis sequences. In one aspect, for 1 bit ACK/NACK configuration, two UCI hypothesis sequences (e.g., ACK/NACK) are possible. In an additional aspect, for a two bit ACK/NACK configuration, four UCI hypothesis sequences (ACK/ACK, ACK/NACK, NACK/ACK, NACK/NACK) are possible. Additionally, the communications component 150 and/or the correlating component 154 may use the hypothesis sequences as pilot tones for performing the correlations.

At block 730, the method 700 includes estimating, at the base station, a channel based on each of the correlated signals. For example, in an aspect, the base station 105 and/or the communications component 150 may include the estimating component 156, such as a specially programmed processor modules, or a processor executing specially programmed code stored in a memory to estimate a channel based on the correlated signals. That is, the estimating component 156 estimates the channel for each of the correlated signals. In other words, a channel corresponding to each of the correlated signals is estimated. The estimating may be performed in a time domain or a frequency domain.

At block 740, the method 700 includes determining, at the base station, a total energy of each of the estimated channels. For example, in an aspect, the base station 105 and/or the communications component 150 may include the determining component 158, such as a specially programmed processor modules, or a processor executing specially programmed code stored in a memory to determine a total energy of each of the estimated channels. The determining component 158 determines the total energy of each of the estimated channels. In other words, a plurality of energies are determined which correspond to the plurality of the estimated channels.

At block 750, the method 700 includes identifying, at the base station, a hypothesis with a highest total energy based on the determining. For example, in an aspect, the base station 105 and/or the communications component 150 may include the identifying component 160, such as a specially programmed processor modules, or a processor executing specially programmed code stored in a memory to identify a hypothesis with a highest total energy based on the determining. That is, the identifying component 160 identifies the hypothesis (or hypothesis sequence) with the highest total energy based on the total energy determined for each of the estimated channels which are further estimated based on the correlated signals.

At block 760, the method 700 includes selecting, at the base station, a sequence associated with the hypothesis with the highest total energy as the sequence that is transmitted to the base station from the UE. For example, in an aspect, the base station 105 and/or the communications component 150 may include the identifying component 160, such as a specially programmed processor modules, or a processor executing specially programmed code stored in a memory to select a sequence associated with the hypothesis with the highest total energy as the sequence that is transmitted to the base station from the UE. That is, the identifying component 160 selects the hypothesis sequence with the highest total energy as the sequence that the UE 110 transmitted to the base station 105. For example, if the identifying component 160 identifies that the sequence associated with an ACK (e.g., from the UE 110) has the highest energy, the base station 105 interprets (e.g., selects, considers, etc.) that an ACK was transmitted from the UE 110.

The base station 105 and/or the communications component 150 may estimate the received signal, "r," (e.g., energy of the received signal) using the following formula:

$$r=h*s+n$$

where "h" is a channel, "s" is a transmitted sequence, and n is a noise and interference variance. Noise and interference variance may be estimated based on the hypothesis sequence with the highest total energy. Further, the base station 105 and/or the communications component 150 compares the highest total energy with a product of a threshold (e.g., defined at the base station 105) and the estimated noise and interference variance to determine whether a sequence is transmitted from the UE 110. In an aspect, the base station 105 may determine that the UE 110 transmitted a sequence from the UE when the highest total energy is greater than the product of the threshold and the estimated noise and interference variance. In an additional or optional aspect, the base station 105 may determine that the UE 110 did not transmit a sequence from the UE (e.g., UE 110 may be in a discontinuous transmission (DTX) mode) when the highest total energy is lower than or equal to the product of the threshold and the noise and interference variance. The UE 110 may not transmit a sequence when the UE 110 missed the physical downlink control channel (PDCCH) grant (e.g., grant for physical downlink shared channel (PDSCH) or grant for physical uplink control channel (PUCCH)) from the base station 105. Consequently, upon selecting a sequence associated with the hypothesis with the highest total energy as the sequence that is transmitted to the base station 105 from the UE 110, the base station 105 can decode the signal and receive the UCI.

Figure 8:
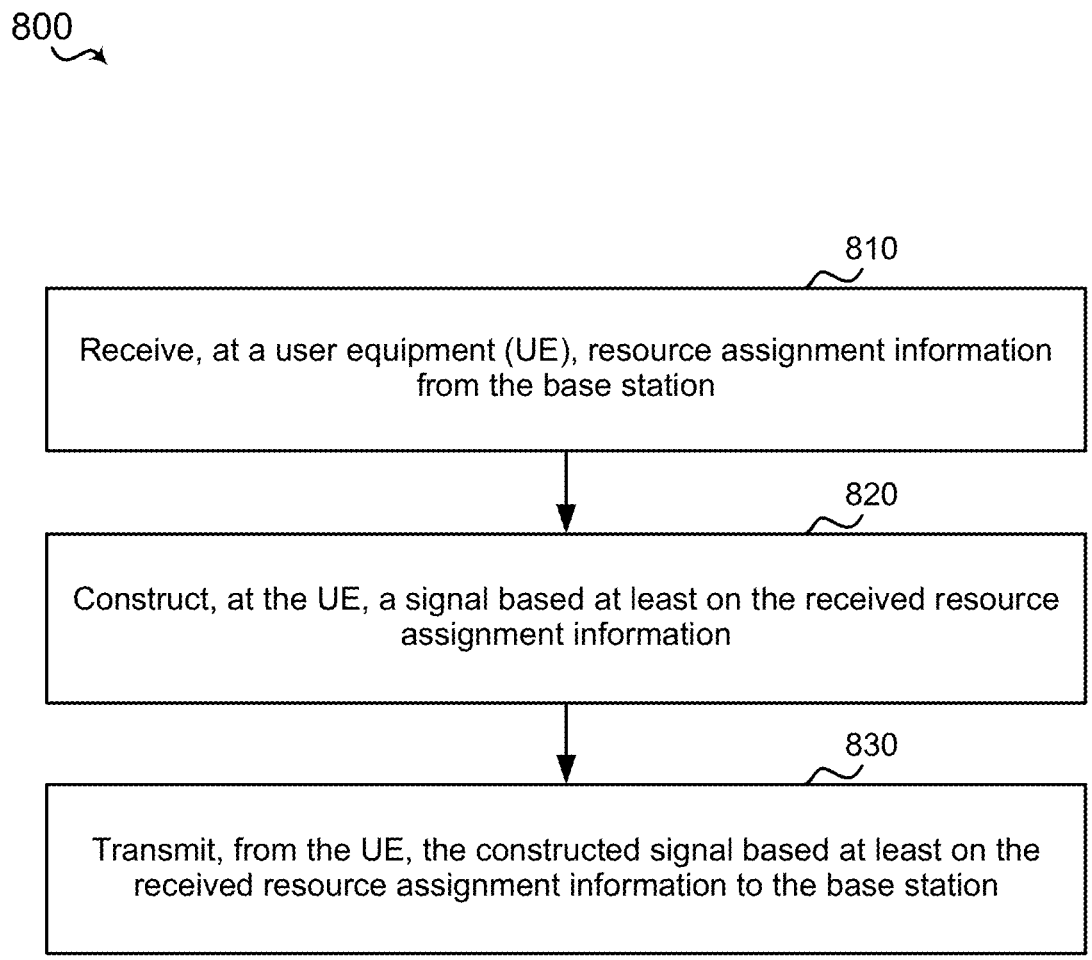
FIG. 8 illustrates an example method for wireless communications with a UE according to various aspects of the present disclosure.

Referring to FIG. 8, for example, a method 800 for wireless communications according to the above-described aspects is disclosed. Method 800 may be executed by UE 110 and/or one or more subcomponents thereof as discussed above and/or as additionally referred to in FIG. 10.

At block 810, the method 800 includes receiving, at the UE, resource assignment information from a base station, wherein the resource assignment information indicates frequency resources, a base sequence index, and a shift index. For example, in an aspect, the UE 110 and/or the communications component 180 may include the receiving component 182, such as a specially programmed processor modules, or a processor executing specially programmed code stored in a memory to receive resource assignment information, e.g., frequency resources, a base sequence index, and/or a shift index from the base station 105, wherein the resource assignment information indicates frequency resources, a base sequence index, and a shift index. The frequency resources may be contiguous RBs (e.g., single cluster) or disjoint RBs (e.g., multi-cluster). For disjoint RBs (or a multi-cluster) transmission, the base sequence index may include base sequence index for each cluster, and the shift index may include shift index for each cluster. This information may be used by the UE 110 to construct signals for carrying UCI to the base station 105. Thus, the resource assignment information indicates to the UE 110, the base station 105's preference for the structure of received UCI-bearing signals.

At block 820, the method 800 includes constructing, at the UE, a signal based at least on the received resource assignment information. For example, in an aspect, the UE 110 and/or the communications component 180 may include the constructing component 184, such as a specially programmed processor modules, or a processor executing specially programmed code stored in a memory to construct a signal based at least on the received resource assignment information. For example, the signal may be a sequence based on the resource assignment information, e.g., frequency resources (RBs), base sequence index, and/or a shift index. To construct the signal, the UE 110 may use the same base sequence index and the same frequency resources assigned to a plurality of users. In some aspects, the UE 110 may use a different shift index relative to the shift indexes of the plurality of users. In other aspects, the UE 110 may use the same shift index or the different shift indexes and the same frequency resources as assigned to the plurality of users and using a different base sequence index relative to the other ones of the plurality of users. Thus, the UE 110 may construct the signal using base sequence indexes or shift indexes that are the same or different from other users within the plurality of users assigned to a resource block by the base station 105.

The constructed signal may include one or two bits of UCI, such as ACK, NACK, and/or or SR bits. The UE 110 may include the one or two bits of UCI during construction of the signal. The constructed signal may be associated with an enhanced mobile broadband (EMBB) service or an ultra-reliable-low latency communications (URLLC) service.

At block 830, the method 800 includes transmitting, from the UE, the constructed signal based at least on the received resource assignment information to the base station. For example, in an aspect, the UE 110 and/or the communications component 180 may include the transmitting component 186, such as a specially programmed processor modules, or a processor executing specially programmed code stored in a memory to transmit the constructed signal based at least on the received resource assignment information to the base station 105.

The resource assignment information may include resource assignment information related to one or more clusters with each of the one or more clusters using a different base sequence. Further a plurality of users may use different base sequences, and the users' signals may be multiplexed within the resource block in a non-orthogonal manner.

Figure 9:
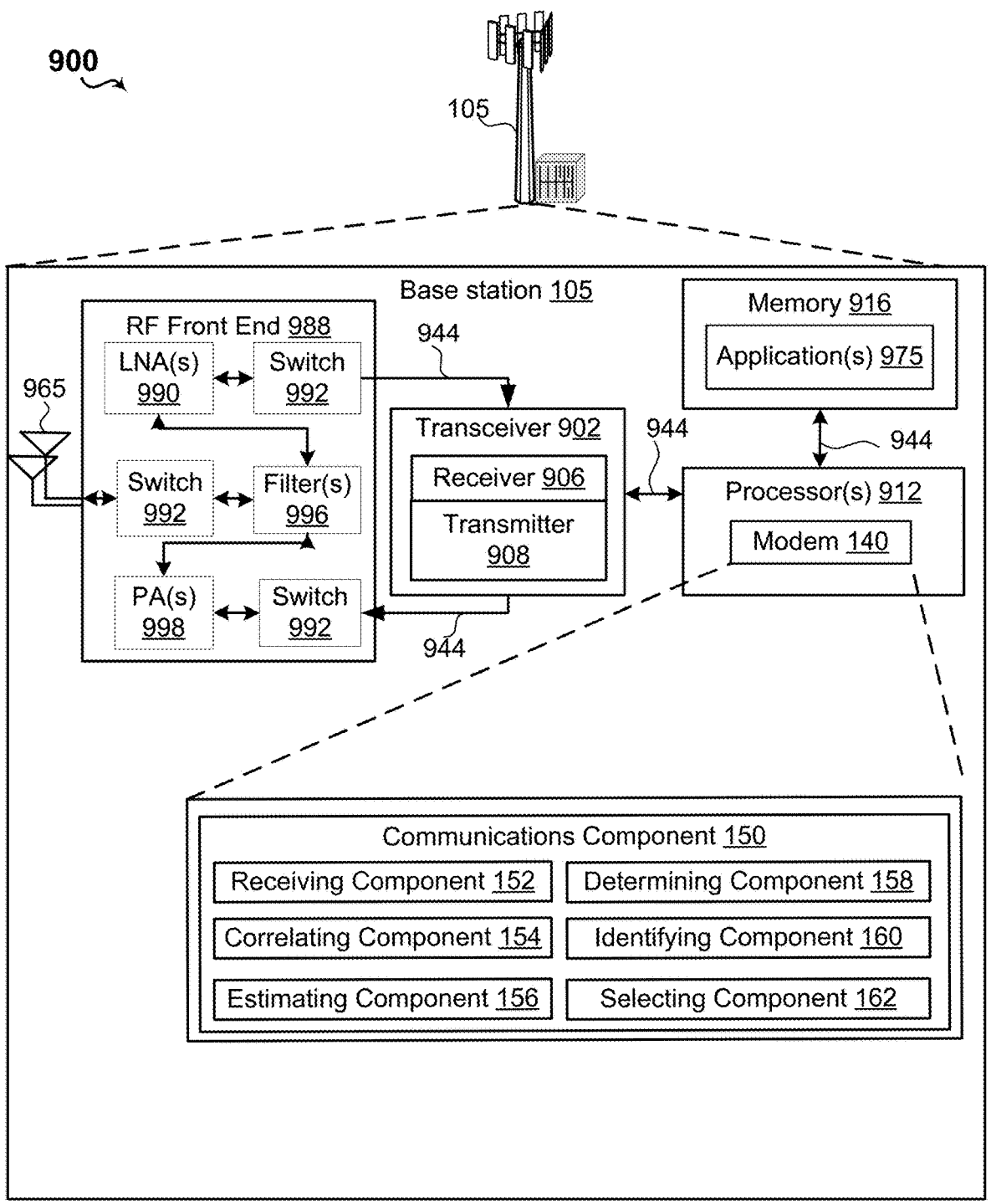
FIG. 9 is a schematic diagram of example components of the base station of FIG. 1.

Referring to FIG. 9, one example of an implementation of an eNB 105 may include a variety of components, some of which have already been described above, including components such as one or more processors 912, memory 916 and transceiver 902 in communication via one or more buses 944, which may operate in conjunction with the modem 140 and communications component 150 for wireless communications. Further, the one or more processors 912, modem 140, memory 916, transceiver 902, RF front end 988 and one or more antennas 965, may be configured to support voice and/or data calls (simultaneously or non-simultaneously) in one or more radio access technologies.

In an aspect, the one or more processors 912 can include a modem 140 that uses one or more modem processors. The various functions related to communications component 150 may be included in modem 140 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with the transceiver 902.

In other aspects, some of the features of the one or more processors 912 and/or modem 140 associated with the communications component 150 may be performed by the transceiver 902.

Also, the memory 916 may be configured to store data used herein and/or local versions of applications 975 or communications component 150 and/or one or more of its subcomponents being executed by at least one processor 912. The memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, the memory 916 may be a non-transitory computer-readable storage medium that stores one or more computer-executable codes defining communications component 150 and/or one or more of its subcomponents, and/or data associated therewith, when the UE 110 is operating at least one processor 912 to execute the communications component 150 and/or one or more of its subcomponents.

The transceiver 902 may include at least one receiver 906 and at least one transmitter 908. The receiver 906 may include hardware, firmware, and/or software code executable by a processor for receiving data, the code comprising instructions and being stored in a memory (e.g., computer-readable medium). The receiver 906 may be, for example, a radio frequency (RF) receiver. In an aspect, the receiver 906 may receive signals transmitted by at least one base station 105. Additionally, the receiver 906 may process such received signals, and also may obtain measurements of the signals, such as, but not limited to, Ec/Io, SNR, RSRP, RSSI, etc. The transmitter 908 may include hardware, firmware, and/or software code executable by a processor for transmitting data, the code comprising instructions and being stored in a memory (e.g., computer-readable medium). A suitable example of the transmitter 908 may include, but is not limited to, a RF transmitter.

Moreover, in an aspect, the UE 110 may include a RF front end 988, which may operate in communication with one or more antennas 965 and transceiver 902 for receiving and transmitting radio transmissions, for example, wireless communications transmitted by at least one base station 105 or wireless transmissions transmitted by the UE 110. The RF front end 988 may be communicatively coupled with one or more antennas 965 and can include one or more low-noise amplifiers (LNAs) 990, one or more switches 992, one or more power amplifiers (PAs) 998, and one or more filters 996 for transmitting and receiving RF signals.

In an aspect, the LNA 990 can amplify a received signal at a desired output level. In an aspect, each LNA 990 may have a specified minimum and maximum gain values. In an aspect, the RF front end 988 may use one or more switches 992 to select a particular LNA 990 and its specified gain value based on a desired gain value for a particular application.

Further, for example, one or more PA(s) 998 may be used by the RF front end 988 to amplify a signal for an RF output at a desired output power level. In an aspect, each PA 998 may have specified minimum and maximum gain values. In an aspect, the RF front end 988 may use one or more switches 992 to select a particular PA 998 and its specified gain value based on a desired gain value for a particular application.

Also, for example, one or more filters 996 can be used by the RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, the RF front end 988 can use one or more switches 992 to select a transmit or receive path using a specified filter 996, LNA 990, and/or PA 998, based on a configuration as specified by the transceiver 902 and/or processor 912.

As such, the transceiver 902 may be configured to transmit and receive wireless signals through one or more antennas 965 via RF front end 988. In an aspect, the transceiver 902 may be tuned to operate at specified frequencies such that the UE 110 can communicate with, for example, one or more cells associated with one or more base stations 105. In an aspect, for example, the modem 140 can configure the transceiver 902 to operate at a specified frequency and power level based on the configuration of the UE 110 and communication protocol used by the modem 140.

In an aspect, the modem 140 can be a multiband-multimode modem, which can process digital data and communicate with the transceiver 902 such that the digital data is sent and received using the transceiver 902. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on base station information associated with the UE 110 as provided by the network during cell selection and/or cell reselection.

Figure 10:
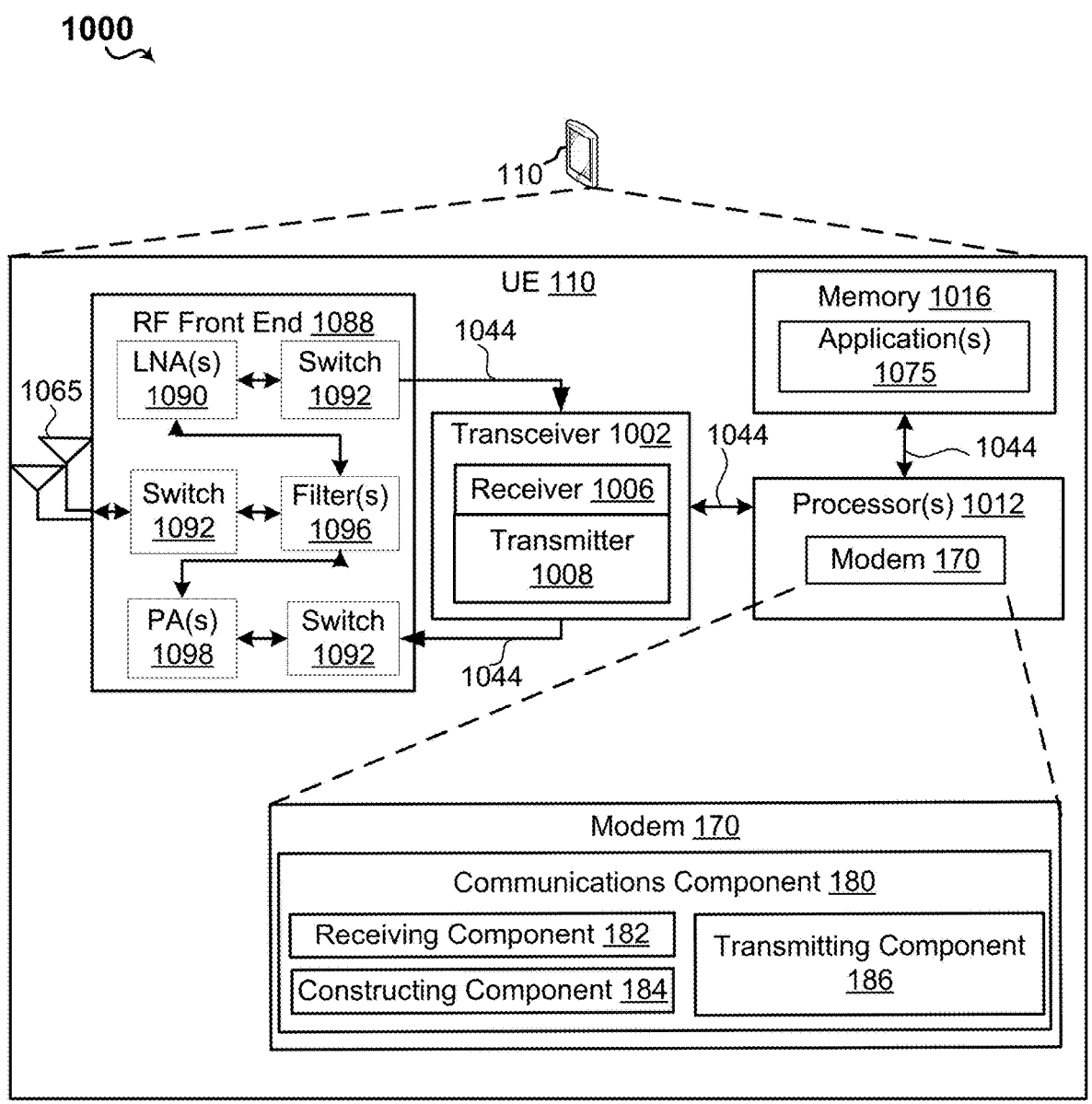
FIG. 10 is a schematic diagram of example components of the UE of FIG. 1.

Referring to FIG. 10, one example of an implementation of an UE 110 may include a variety of components, some of which have already been described above, including components such as one or more processors 1012, memory 1016 and transceiver 1002 in communication via one or more buses 1044, which may operate in conjunction with the modem 140 and communications component 150 for wireless communications. Further, the one or more processors 1012, modem 170, memory 1016, transceiver 1002, RF front end 1088 and one or more antennas 1065, may be configured to support voice and/or data calls (simultaneously or non-simultaneously) in one or more radio access technologies.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a user equipment (UE), comprising:
   receiving, at the UE, resource assignment information from a base station, wherein the resource assignment information indicates frequency resources and a shift index;
   constructing, at the UE, a signal based at least on the received resource assignment information, wherein the signal comprises a sequence from a plurality of sequences with each sequence having an associated cyclic shift corresponding to different uplink control information (UCI); and
   transmitting, from the UE, the constructed signal based at least on the received resource assignment information to the base station.

2. The method of claim 1, wherein the resource assignment information includes frequency resource assignment information related to one or more clusters.

3. The method of claim 2, wherein the frequency resource assignment information includes the frequency resource assignment information related to a plurality of clusters, wherein each of the plurality of clusters use a different base sequence, and wherein same or different cyclic shifts are used in each cluster.

4. The method of claim 1, wherein the resource assignment information includes frequency resource assignment information related to a plurality of clusters, and wherein each of the plurality of clusters use a different base sequence.

5. The method of claim 1, wherein the signal is multiplexed with other signals from a plurality of users within a resource block.

6. The method of claim 1, wherein constructing the signal further comprises:
   using a same base sequence index and same frequency resources assigned to a plurality of users and using a different shift index relative to other ones of the plurality of users.

7. The method of claim 1, wherein constructing the signal further comprises:
   using a same shift index or different shift indexes and the same frequency resources as assigned to a plurality of users and using a different base sequence index relative to the other ones of the plurality of users.

8. The method of claim 1, wherein the UCI comprises one or two symbols.

9. The method of claim 8, wherein the UCI includes acknowledgement (ACK), negative-acknowledgement (NACK), or scheduling request (SR) information.

10. The method of claim 1, wherein the signal is associated with an enhanced mobile broadband (EMBB) service or an ultra-reliable-low latency communications (URLLC) service.

11. The method of claim 1, wherein the UCI is one bit having one of two associated cyclic shifts.

12. The method of claim 1, wherein the UCI is two bits having one of four associated cyclic shifts.

13. A user equipment (UE), comprising:
   a memory; and
   a processor in communication with the memory and configured to:
      receive resource assignment information from a base station, wherein the resource assignment information indicates frequency resources and a shift index;
      construct a signal based at least on the received resource assignment information, wherein the signal comprises a sequence from a plurality of sequence with each sequence having an associated cyclic shift corresponding to different uplink control information (UCI); and
      transmit the constructed signal based at least on the received resource assignment information to the base station.

14. The UE of claim 13, wherein the resource assignment information includes frequency resource assignment information related to one or more clusters.

15. The UE of claim 13, wherein the resource assignment information includes frequency resource assignment information related to a plurality of clusters, and wherein each of the plurality of clusters use a different base sequence.

16. The UE of claim 13, wherein the frequency resource assignment information includes frequency resource assignment information related to a plurality of clusters, wherein the each of the plurality of clusters use a different base sequence, and wherein same or different cyclic shifts are used in each cluster.

17. The UE of claim 13, wherein the signal is multiplexed with other signals from a plurality of users within a resource block.

18. The UE of claim 17, wherein the processor is further configured to construct the signal by:
   using a same base sequence index and same frequency resources assigned to a plurality of users and using a different shift index relative to other ones of the plurality of users.

19. The UE of claim 17, wherein the processor is further configured to construct the signal by:
   using a same shift index or different shift indexes and the same frequency resources as assigned to the plurality of users and using a different base sequence index relative to the other ones of the plurality of users.

20. The UE of claim 13, wherein the UCI comprises one or two symbols.

21. The UE of claim 20, wherein the UCI includes acknowledgement (ACK), negative-acknowledgement (NACK), or scheduling request (SR) information.

22. The UE of claim 13, wherein the signal is associated with an enhanced mobile broadband (EMBB) service or an ultra-reliable-low latency communications (URLLC) service.

23. The UE of claim 13, wherein the UCI is a one bit having one of two associated cyclic shifts.

24. The UE of claim 13, wherein the UCI is two bits having one of four associated cyclic shifts.

25. A user equipment (UE), comprising:
   means for receiving resource assignment information from a base station, wherein the resource assignment information indicates frequency resources and a shift index;
   means for constructing a signal based at least on the received resource assignment information, wherein the signal comprises a sequence from a plurality of sequences with each sequence having an associated cyclic shift corresponding to different uplink control information (UCI); and
   means for transmitting the constructed signal based at least on the received resource assignment information to the base station.

26. A non-transitory computer-readable medium storing computer code executable by a processor for wireless communications, comprising:
   code for receiving resource assignment information from a base station, wherein the resource assignment information indicates frequency resources and a shift index;
   code for constructing a signal based at least on the received resource assignment information, wherein the signal comprises a sequence from a plurality of sequences with each sequence having an associated cyclic shift corresponding to different uplink control information (UCI); and
   code for transmitting the constructed signal based at least on the received resource assignment information to the base station.

27. The non-transitory computer-readable medium of claim 26, wherein the resource assignment information includes frequency resource assignment information related to one or more clusters.

28. The non-transitory computer-readable medium of claim 26, wherein the resource assignment information includes frequency resource assignment information related to a plurality of clusters, and wherein each of the plurality of clusters use a different base sequence.

29. The non-transitory computer-readable medium of claim 26, wherein the frequency resource assignment information includes frequency resource assignment information related to a plurality of clusters, wherein the each of the plurality of clusters use a different base sequence, and wherein same or different cyclic shifts are used in each cluster.

30. The non-transitory computer-readable medium of claim 26, wherein the signal is multiplexed with other signals from a plurality of users within a resource block.

31. The non-transitory computer-readable medium of claim 30, wherein the code for constructing the signal further comprises:
   code using a same base sequence index and same frequency resources assigned to the plurality of users and using a different shift index relative to other ones of the plurality of users.

32. The non-transitory computer-readable medium of claim 30, wherein the code for constructing the signal further comprises:
   code using a same shift index or different shift indexes and the same frequency resources as assigned to the plurality of users and using a different base sequence index relative to the other ones of the plurality of users.

33. The non-transitory computer-readable medium of claim 26, wherein the UCI comprises one or two symbols.

34. The non-transitory computer-readable medium of claim 33, wherein the UCI includes acknowledgement (ACK), negative-acknowledgement (NACK), or scheduling request (SR) information.

35. The non-transitory computer-readable medium of claim 26, wherein the signal is associated with an enhanced mobile broadband (EMBB) service or an ultra-reliable-low latency communications (URLLC) service.

36. The non-transitory computer-readable medium of claim 26, wherein the UCI is a one bit having one of two associated cyclic shifts.

37. The non-transitory computer-readable medium claim 26, wherein the UCI is two bits having one of four associated cyclic shifts.

* * * * *